United States Patent
Sugita et al.

(10) Patent No.: US 7,754,784 B2
(45) Date of Patent: Jul. 13, 2010

(54) OIL-BASED INK COMPOSITIONS FOR INKJET PRINTERS

(75) Inventors: Yukio Sugita, Yokohama (JP);
Mitsuyoshi Tamura, Yokohama (JP);
Mitsuteru Yamada, Yokohama (JP);
Tamayo Okahira, Yokohama (JP)

(73) Assignee: The Inctec Inc., Yokohama-shi (JP)

( * ) Notice: Subject to any disclaimer, the term of this patent is extended or adjusted under 35 U.S.C. 154(b) by 0 days.

(21) Appl. No.: 11/740,444

(22) Filed: Apr. 26, 2007

(65) Prior Publication Data
US 2007/0270525 A1 Nov. 22, 2007

(30) Foreign Application Priority Data
May 16, 2006 (JP) .............................. 2006-135967

(51) Int. Cl.
*C09D 11/00* (2006.01)
(52) U.S. Cl. .................... 523/160; 523/161; 106/31.13; 524/556
(58) Field of Classification Search ................. 523/160, 523/161
See application file for complete search history.

(56) References Cited

U.S. PATENT DOCUMENTS

| | | | |
|---|---|---|---|
| 5,385,957 A * | 1/1995 | Tobias et al. ................. | 523/161 |
| 5,665,434 A * | 9/1997 | Mass et al. ................. | 427/393.5 |
| 6,160,044 A * | 12/2000 | Jimbo et al. ................. | 524/241 |
| 2001/0020055 A1* | 9/2001 | Ishizuka et al. ............. | 523/161 |
| 2004/0266907 A1* | 12/2004 | Sugita et al. ................ | 523/160 |
| 2006/0063858 A1 | 3/2006 | Kang et al. | |
| 2006/0063897 A1* | 3/2006 | Nagafuchi et al. ............ | 526/73 |
| 2007/0000409 A1 | 1/2007 | Sugita et al. | |
| 2007/0167538 A1* | 7/2007 | Mochizuki et al. .......... | 523/160 |

FOREIGN PATENT DOCUMENTS

| | | |
|---|---|---|
| EP | 1 491 597 A1 | 12/2004 |
| JP | 2003-96370 | 4/2003 |
| JP | 2005-200469 | 7/2005 |
| WO | WO 00/20521 | 4/2000 |
| WO | WO 2004/058826 * | 7/2004 |
| WO | WO 2006/016674 A1 | 2/2006 |

OTHER PUBLICATIONS

Lazzari, Polymer 41 (2000) 6447-6455, Thermal ageing of paraloid acrylic protective polymers.*
Machine translation of JP 2005200469 A.*

* cited by examiner

*Primary Examiner*—Vasu Jagannathan
*Assistant Examiner*—Doris L Lee
(74) *Attorney, Agent, or Firm*—Oblon, Spivak, McClelland, Maier & Neustadt, L.L.P.

(57) ABSTRACT

An oil-based ink composition for inkjet printers contains a fixing polymer and a solvent represented by the following formula (1):

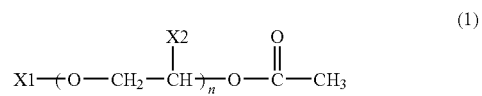

wherein X1 represents an alkyl group, X2 represents a hydrogen atom or alkyl group, and n stands for an integer of from 1 to 4. The fixing polymer is an acrylic polymer obtained by subjecting an acrylic monomer to solution polymerization with a radical polymerization initiator in the solvent. A production process of the oil-based ink composition is also disclosed.

18 Claims, 4 Drawing Sheets

OIL-BASED INK COMPOSITIONS FOR INKJET PRINTERS

FIELD OF THE INVENTION

This invention relates to oil-based ink compositions for inkjet printers (which may hereinafter be referred to simply as "inks"), and specifically to inks excellent not only in ejection stability and ejection recoverability but also in storage stability and also superb in drying properties and the abrasion resistance of prints.

BACKGROUND OF THE INVENTION

Conventional inkjet recording methods include the continuous method and the drop-on-demand method. According to the former method, continuously-ejected inks are selectively caused to strike a medium. According to the latter method, on the other hand, inks are selectively ejected. In recent years, however, drop-on-demand printers have become the mainstream. These drop-on-demand printers can be divided into two types, one being the bubble jet system that inks are rapidly heated to eject them by the resulting bubbles, and the other being the piezoelectric system that inks are ejected using ceramics (piezoelectric elements) which deform when voltages are applied.

The above-described piezoelectric system, which uses conventional oil-based inks, ejects the inks by using piezoelectric elements as pumps to convert electric energy into mechanical energy, and basically, can eject various ink materials. However, this system ejects inks depending on the existence or non-existence of signals. At end faces of nozzles through which the ejection of the inks is suspended, the solvents in the inks evaporate. As a consequence, ink clogging may take place by the deposition of solid components from the inks; or the ejection of the inks may be inhibited by increased viscosity of the inks within the nozzles due to concentrated inks. It has, accordingly, been required to frequently conduct maintenance work. In particular, inks which are useful in the production of prints for outdoor use employ, as printing media, non-absorbent media, namely, plastic films such as polyvinyl chloride sheets. They, therefore, use as an ink solvent a solvent having relatively high volatility. As a consequence, the inks dry up rapidly, resulting in marked occurrence of ink clogging.

When the air dissolved in an ink exceeds a certain level, microbubbles which occur in printhead nozzles as a result of the development of cavitations by high-frequency oscillations of piezoelectric elements absorb pressures, leading to a reduction in drive response. In addition, ejection troubles may be induced by the production of bubbles within nozzles as a result of changes in the surrounding air temperature.

With a view to overcoming the above-mentioned problems, inkjet pigment inks making use of high-boiling solvents have been proposed as substitutes for conventional oil-based inks (JP-A-2003-96370). Glycol ether esters employed as the above-mentioned high-boiling solvents are high in boiling point and low in vapor pressure, so that the proposed inks do not cause much printhead nozzle clogging during printing. Compared with low-boiling solvents which have been used conventionally, the glycol ether esters are, however, lower in polymer solubility. When a commercially-available solid polymer is used as a fixing polymer by dissolving it in a solvent or when a polymer having a high glass transition point is used, the resulting ink is, therefore, not provided with ejectability such as ink ejection or ejection recovery to any sufficiently satisfactory level. Especially when employed in such piezoelectric inkjet printers as mentioned above, no sufficient ink ejectability is available. Further, when printing is resumed subsequent to a temporary discontinuation, the ink ejection recoverability is lowered, thereby failing to provide prints of stable quality.

Therefore, an object of the present invention is to provide an oil-based ink composition for inkjet printers, especially inkjet printers of the piezoelectric inkjet printers, which is excellent in ejection stability, ejection recoverability and storage stability and is also superb in drying properties on recording media and in the abrasion resistance of prints.

BRIEF SUMMARY OF THE INVENTION

The above-described object can be achieved by the present invention to be described hereinafter. Described specifically, the present invention provides an oil-based ink composition for inkjet printers, comprising a fixing polymer and a solvent represented by the below-described formula (1) (which may hereinafter be referred to simply as "a particular solvent"), said fixing polymer being an acrylic polymer obtained by conducting solution polymerization with a radical polymerization initiator in said solvent:

(1)

wherein X1 represents an alkyl group, X2 represents a hydrogen atom or alkyl group, and n stands for an integer of from 1 to 4.

The present invention also provides a process for the production of an oil-based ink composition for inkjet printers, which comprises subjecting an acrylic monomer to solution polymerization with a radical polymerization initiator in a particular solvent represented by the formula (1) and using a resulting acrylic polymer solution.

The oil-based ink composition according to the present invention for inkjet printers is excellent in ejection stability, ejection recoverability and storage stability and is also superb in drying properties under printing on recording media and in the abrasion resistance of prints. It is suited for printing polyvinyl chloride media and the like, and for its excellent drying properties, abrasion resistance, storage stability, ejection stability and ejection recoverability, prints are free from blocking even when continuously printed, and prints of high abrasion resistance and stable print quality can be obtained. It is suited especially for piezoelectric inkjet printers.

DETAILED DESCRIPTION OF THE INVENTION

The present invention will next be described in further detail based on certain preferred embodiments. The fixing polymer (acrylic polymer) for use in the present invention can be used preferably as a solution of the acrylic polymer, which is obtained by subjecting an acrylic monomer as a primary monomer to polymerization with the radical polymerization initiator in the particular solvent. The acrylic polymer solution contains a reaction product having a structure that molecules of the particular solvent are bonded to one ends of molecules of the acrylic polymer, respectively. Accordingly, the acrylic polymer is thoroughly dissolved in the solvent. When the solution is formulated into an ink, the ink is provided with ejection stability, ejection recoverability, print drying properties and print abrasion resistance, all of which are significantly improved over those available when conventional acrylic polymers are simply dissolved in solvents. In particular, even with an acrylic polymer which has a high glass transition point or a high molecular weight and has heretofore been hardly usable from the standpoint of solubility, its production by the above-described polymerization process permits its use as a fixing polymer for an ink so that prints obtained with the ink can be provided with much improved abrasion resistance or the like.

Examples of the particular solvent represented by the formula (1) and employed in the present invention include glycol ether acetates derived from glycols such as ethylene glycol, diethylene glycol, triethylene glycol, tetraethylene glycol, and propylene glycol. These particular solvents can be used either singly or in combination. Specific examples include ethylene glycol monomethyl ether acetate, ethylene glycol monoethyl ether acetate, ethylene glycol monobutyl ether acetate, propylene glycol monomethyl ether acetate, diethylene glycol monopropyl ether acetate, diethylene glycol monobutyl ether acetate, triethylene glycol ethyl ether acetate, and triethylene glycol monobutyl ether acetate; preferably at least one glycol ether acetate selected from ethylene glycol monobutyl ether acetate, propylene glycol monomethyl ether acetate and diethylene glycol monobutyl ether acetate; particularly preferably ethylene glycol monobutyl ether acetate. The above-described particular solvent is effective in obtaining a reaction product having a structure that molecules of the particular solvent are bonded to one ends of molecules of an acrylic polymer obtained by polymerizing an acrylic monomer as a primary monomer with the radical polymerization initiator in the solvent.

As the particular solvent, one having a boiling point of from 130 to 250° C. can be used preferably. If the boiling point is too high, the formulation of an ink with a solution of the acrylic polymer in the solvent results in reduced drying properties and induces blocking or the like of prints. If the boiling point is too low, on the other hand, the formulation of an ink with a solution of the acrylic polymer in the solvent results in excessively fast ink drying, thereby tending to lead to reduced print-working due to the occurrence of ink clogging at printhead nozzles.

Illustrative of the monomer which constitutes the acrylic polymer are alkyl, aralkyl, alkoxyalkyl, hydroxyalkyl, dialkylaminoalkyl, aryl and like esters of (meth) acrylic acid (the term "(meth)acrylic acid" means both acrylic acid and methacrylic acid); and (meth) acrylic acid. Among these, it is preferred to use, as a primary monomer constituting the acrylic polymer, at least one monomer selected from the group consisting of alkyl(meth)acrylates, aralkyl(meth)acrylates, alkoxyalkyl (meth)acrylates, hydroxyalkyl(meth)acrylates, (meth)acrylic acid, and dialkylaminoalkyl(meth)acrylates.

Specific examples of the monomer include (meth)acrylic acid; (meth)acrylate esters such as methyl, ethyl, n- or iso-propyl, n-, iso- or tert-butyl, pentyl, neopentyl, hexyl, 2-ethylhexyl, octyl, iso-octyl, nonyl, iso-nonyl, dodecyl, tridecyl, stearyl, cyclopentyl, cyclohexyl, 2-methylcyclohexyl, dicyclopentanyl, dicyclopentenyloxyethyl, dicyclohexyl, isobornyl, adamantyl, allyl, propargyl, phenyl, naphthyl, anthracenyl, anthraquinonyl, piperonyl, salicyl, furyl, furfuryl, tetrahydrofuryl, tetrahydrofurfuryl, piranyl, benzyl, phenethyl, cresyl, glycidyl, 3,4-epoxycyclohexylmethyl, 3,4-epoxycyclohexylethyl, 1,1,1-trifluoroethyl, perfluoroethyl, perfluoro-n-propyl, perfluoro-iso-propyl, heptadecafluorodecyl, triphenylmethyl, cumyl, 3-(N,N-dimethylamino)propyl, 2-hydroxyethyl, 2-hydroxypropyl, 2,3-dihydroxypropyl, 4-hydroxybutyl, methoxyethyl, ethoxyethyl, butoxyethyl, 2-cyanoethyl, dimethylaminoethyl, diethylaminoethyl, trimethoxysilylpropyl, and triethoxysilylpropyl(meth)acrylates; and the (meth)acrylate esters of 4-hydroxybutyl(meth) acrylate glycidyl ether, 3-methacryloxypropylmethyldiethoxysilane, 3-methacryloxypropylmethyldimethoxysilane and the like.

Other specific examples of the monomer include (meth) acrylic acid amides such as (meth)acrylic acid amide, N,N-dimethylamide, N,N-diethylamide, N,N-dipropylamide, N,N-di-iso-propylamide, butylamide, stearylamide, cyclohexylamide, phenylamide, benzylamide, and anthracenylamide.

Upon polymerization of the acrylic monomer, other monomers can be copolymerized. Examples of such other monomers include vinyl monomers such as vinyl aromatic compounds, (meth)acrylanilide, (meth)acryloylnitrile, acrolein, vinyl chloride, vinylidene chloride, vinyl fluoride, vinylidene fluoride, N-vinylpyrrolidone, vinylpyrimidine, N-vinylcarbazole, vinylimidazole, and vinyl acetate, with vinyl aromatic compounds being preferred.

Illustrative of the vinyl aromatic compounds are styrene; and α-, o-, m-, p-alkyl, nitro, cyano, amido and ester derivatives of styrene.

As the radical polymerization initiator for use in the polymerization of the monomer, it is preferred to use at least one organic peroxide selected from the group consisting of organic peroxides of hydroperoxide, dialkyl peroxide, peroxyester, diacyl peroxide, peroxycarbonate, peroxyketal, ketone peroxide and like types. These organic peroxides are each effective in obtaining, as the fixing polymer, a reaction product having a structure that molecules of the particular solvent are bonded to one ends of molecules of the acrylic polymer. These organic peroxides can be used either singly or in combination.

Examples of the radical polymerization initiators of the hydroperoxide type include t-butyl hydroperoxide*, 1,1,3,3- tetramethylbutyl hydroperoxide*, p-methane hydroperoxide, cumene hydroperoxide*, and diisopropylbenzene hydroperoxide. It is to be noted that the asterisked compounds are radical polymerization initiators which are particularly preferably usable in the present invention. This will apply equally hereinafter.

Examples of the radical polymerization initiators of the dialkyl peroxide type include di-t-butyl peroxide*, di-t-hexyl peroxide*, t-butylcumylperoxide, dicumylperoxide, 2,5-dimethyl-2,5-di(t-butylperoxy)hexane, 2,5-dimethyl-2,5-di(t-butylperoxy)hexyne-3, and di(2-t-butylperoxyisopropyl)benzene.

Examples of the radical polymerization initiators of the peroxyester type include 1,1,3,3-tetramethylbutyl peroxyneodecanoate*, α-cumyl peroxyneodecanoate*, t-butyl peroxyneodecanoate*, t-hexyl peroxyneodecanoate*, 1-cyclohexyl-1-methylethyl peroxyneodecanoate*, t-butyl peroxyneoheptanoate, t-hexyl peroxypivalate*, t-butyl peroxypivalate*, 1,1,3,3-tetramethylbutyl peroxy-2-ethylhexanoate*, t-amyl peroxy-2-ethylhexanoate, t-butyl peroxy-2-ethylhexanoate*, t-hexyl peroxy-2-ethylhexanoate*, t-butyl peroxy-2-ethylhexylmonocarbonate*, t-amyl peroxy-3,5,5-trimethylhexanoate, t-butyl peroxy-3,5,5-trimethylhexanoate*, t-butyl peroxyacetate*, t-butyl peroxyisobutyrate*, t-butyl peroxybenzoate*, t-butyl peroxy-3-methylbenzoate*, t-hexylperoxybenzoate*, di-t-butyl peroxytrimethyladipate, di-t-butyl peroxyhexahydroterephthalate, t-butyl peroxymaleate, t-butyl peroxylaurate*, t-butyl peroxyisopropylmonocarbonate*, t-hexyl peroxyisopropylmonocarbonate*, 2,5-dimethyl-2,5-di(2-ethylhexanoylperoxy)hexane*, 2,5-dimethyl-2,5-di(3-methylbenzoylperoxy)hexane*, and 2,5-dimethyl-2,5-di(benzoylperoxy)hexane.

Examples of the radical polymerization initiators of the diacyl peroxide type include diisobutyl peroxide, di(3,5,5-trimethylhexanoyl)peroxide*, dilauroyl peroxide*, dibenzoyl peroxide*, di-n-octanoyl peroxide, distearoyl peroxide*, disuccinic acid peroxide*, and di(4-methylbenzoyl)peroxide.

Examples of the radical polymerization initiators of the peroxycarbonate type include di(2-ethoxyethyl) peroxydicarbonate, di-n-propyl peroxydicarbonate, diisopropyl peroxydicarbonate, t-butyl peroxydiisopropylcarbonate, 1,6-bis(t-butylperoxycarbonyloxy)hexane, di(3-methoxybutyl) peroxydicarbonate, di-sec-butyl peroxydicarbonate, t-butyl peroxy-2-ethylhexylcarbonate, di(2-ethylhexyl) peroxydicarbonate, di-1-methylheptyl peroxydicarbonate, and di(4-t-butylcyclohexyl)peroxydicarbonate*.

Examples of the radical polymerization initiators of the peroxyketal type include 2,2-di(4,4-di-t-butylperoxycyclohexyl)propane, 2,2-di(t-butylperoxy)butane*, 1,1-di(t-butylperoxy)cyclohexane*, 1,1-di(t-butylperoxy)-2-methylcyclohexane*, 1,1-di(t-butylperoxy)-3,3,5-trimethylcyclohexane, 1,1-di(t-hexylperoxy)cyclohexane*, 1,1-di(t-hexylperoxy)-3,3,5-trimethylcyclohexane*, and n-butyl-4,4-di(t-butylperoxy)valerate.

Examples of the radical polymerization initiators of the ketone peroxide type include acetylacetone peroxide, cyclohexanone peroxide, and methylcyclohexanone peroxide.

Among the above-described radical polymerization initiators, preferred is at least one organic peroxide selected from the group consisting of organic peroxides of the peroxyester, dialkyl peroxide, diacyl peroxide and peroxyketal types, with a peroxyester organic peroxide being particularly preferred. The above-described radical polymerization initiators can be used either singly or in combination. In particular, t-butyl peroxy-2-ethylhexanoate and t-butyl peroxyisopropylmonocarbonate, as peroxyester radical polymerization initiators, and dibenzoyl peroxide, as a diacyl peroxide polymerization initiator, are effective for the synthesis of the fixing polymer for use in the present invention. These radical polymerization initiators can each be preferably used in obtaining a reaction product having a structure that molecules of the particular solvent are bonded to one ends of molecules of the acrylic polymer obtained by subjecting the acrylic monomer to solution polymerization in the particular solvent.

The fixing polymer for use in the present invention can be obtained, for example, by evenly mixing the monomer and polymerization initiator in the particular solvent while adding a mixture of the monomer and polymerization initiator dropwise into the particular solvent over 1 to 2 hours, and then conducting a polymerization or copolymerization reaction at 100° C. for 2 hours. The preferred usage ratio (v/u) of the radical polymerization initiator (v) to the monomer (u), which constitutes the fixing polymer, is from 0.1/100 to 20/100 by weight, with 0.1/100 to 5/100 by weight being more preferred. Further, the preferred usage ratio (p/b) of the monomer (p) to the particular solvent (b) is from 10/100 to 150/100 by weight, with 25/100 to 130/100 by weight being more preferred. When the usage ratio of the radical polymerization initiator (v) to the monomer (u) and the usage ratio of the monomer (p) to the particular solvent (b) are within the above-described ranges, respectively, the resulting acrylic polymer solution contains a reaction product having a structure that molecules of the particular solvent are bonded to one ends of molecules of the acrylic polymer, respectively, so that the acrylic polymer is thoroughly dissolved in the solvent. When the solution is formulated into an ink, the ink is provided with ejection stability, ejection recoverability, print drying properties and print abrasion resistance, all of which are significantly improved over those available when conventional acrylic polymers are simply dissolved in solvents.

A preferred fixing polymer for use in the present invention can be a homopolymer of methyl methacrylate or a copolymer between at least one monomer (y) selected from butyl methacrylate, ethoxyethyl methacrylate, benzyl methacrylate and methacrylic acid and methyl methacrylate (x) at a copolymerization ratio (y/x) of from 0.01/100 to 60/100 by weight.

As the fixing polymer, one having a glass transition point of at least 80° C., preferably from 85 to 110° C. can be used preferably. An excessively low glass transition point tends to cause blocking of prints produced with an ink which contains the fixing polymer, and provides the prints with reduced abrasion resistance.

The polymer can have a weight average molecular weight of from 10,000 to 100,000, preferably from 20,000 to 90,000. An excessively high weight average molecular weight provides the resulting fixing polymer with lowered solubility to the particular solvent. An unduly low weight average molecular weight, on the other hand, provides prints, which are produced with an ink containing the fixing polymer, with reduced abrasion resistance.

The ink of the present invention can further comprise at least one resin selected from vinyl chloride resins and cellulose-based resins. As the amount of a vinyl chloride resin and/or cellulose-based resin to be added to the fixing polymer when the vinyl chloride resin and/or cellulose-based resin is used, the ratio of the vinyl chloride resin and/or cellulose-based resin to the fixing polymer may preferably be from 1/100 to 150/100 by weight.

Examples of the vinyl chloride resins include vinyl chloride/vinyl acetate copolymer, vinyl chloride/vinyl acetate/maleic acid copolymer, vinyl chloride/vinyl acetate/vinyl alcohol copolymer, vinyl chloride/vinyl acetate/hydroxy- alkyl acrylate copolymers, vinyl chloride/vinyl isobutyl ether copolymer, and mixtures thereof.

On the other hand, examples of the cellulose-based resins include nitrocellulose, acetylcellulose, cellulose acetate butyrate, ethylcellulose, ethylhydroxyethylcellulose, cellulose acetate propionate, and mixtures thereof.

In the ink of the present invention, one or more other resins soluble in the solvent represented by the formula (1) can also be used in combination to an extent not detrimental to the object of the present invention. Examples of the resins which can be used in combination include vinyl resins such as acrylic resins, polyvinyl acetate resins and butyral resins, all of which are other than those described above, polyester resins, polyamide resins, epoxy resins, rosin derivatives such as rosin-modified phenol resins, and petroleum resins.

The ink of the present invention may further comprise a cyclic ester as a part of the solvent. The cyclic ester is used to suppress precipitation of solids from the ink on the end faces of printhead nozzles or a rise in the viscosity of the ink due to a concentration of the ink in printhead nozzles and hence to further improve ink ejectability and ejection recoverability, especially in piezoelectric inkjet printers. When the cyclic ester is used, it may be added preferably in such an amount that it accounts for 1 wt. % to 30 wt. % of the sum of the particular solvent and the cyclic ester.

Illustrative of the cyclic ester are cyclic ester compounds which contain an ester group in their rings and are liquid at room temperature, such as β-lactones, γ-lactones, δ-lactones and ε-lactones, preferably cyclic ester compounds represented by the following formula (2):

wherein X3 and X4 each independently represents a hydrogen atom or a $C_{1-7}$ alkyl or alkenyl group, and m stands for an integer of from 1 to 3.

Examples of the cyclic ester compound represented by the formula (2) include γ-lactones such as γ-butyrolactone, γ-valerolactone, γ-caprolactone, γ-caprylolactone and γ-laurolactone, and δ-lactones such as δ-valerolactone. Among the above-described lactones, a particularly-preferred lactone is γ-butyrolactone and/or γ-valerolactone.

Preferably, the ink of the present invention may further contain a dispersant, desirably a high molecular dispersant. As the dispersant, any desired one of dispersants employed in oil-based inkjet inks can be used. Examples of the high molecular dispersant include dispersants having polyester, polyacrylic, polyurethane, polyamine, polycaprolactone or like backbones and containing, as side chains, polar groups such as amino, carboxyl, sulfone, hydroxyl or like groups, with high molecular dispersants of the polyester type being preferred. As a high molecular dispersant of the polyester type, one available under the trade name of "SOLSPERSE 32000" (product of The Lubrizol Corporation) can be used in the present invention.

The ink of the present invention may be a colorant ink containing a colorant therein, although it may also be a varnish ink containing no colorant. In the ink of the present invention, one or more additives such as a surfactant, a plasticizer, an antistatic agent, a viscosity modifier, a defoaming agent, an antioxidant and/or an ultraviolet absorber can also be added and used as needed, to extents not detrimental to the object of the present invention.

As the colorant, organic or inorganic, pigments and dyes useful in oil-based inks can be used either singly or in combination. Examples of the pigments include organic pigments, e.g., phthalocyanine pigments such as phthalocyanine blue and phthalocyanine green, pyranthrone pigments such as pyranthrone orange and pyranthrone red, soluble azo pigments such as permanent red 2B, pigment scarlet and lithol red, insoluble azo pigments such as benzidine yellow, Hanza yellow and toluidine red, quinophthalone pigments such as quinophthalone yellow, thioindigo pigments, benzimidazolone pigments, anthraquinone pigments, dioxazine pigments, diketopyrrolopyrole pigments, isoindolinone pigments, quinacridone pigments, azo lake pigments, threne pigments, and perylene pigments; inorganic pigments such as titanium oxide, antimony red, cadmium yellow, cobalt blue, ultramarine, Prussian blue, red iron oxide, zinc white, graphite, calcium carbonate, barium sulfate, and silicon dioxide; and carbon black.

Examples of the dyes include naphthol dyes, azo dyes, anthraquinone dyes, quinoline dyes, naphthoquinone dyes, nitroso dyes, quinoneimine dyes, benzoquinone dyes, cyanine dyes, nitro dyes, and metal complex dyes.

The ink of the present invention can be formulated by kneading and dispersing the above-described individual components into a uniform mixture in a manner known per se in the art. For example, the colorant and dispersant are added to the particular solvent, and subsequent to stirring for 1 hour at 1,000 rpm in a dissolver, provisional dispersion is conducted in a bead mill filled with zirconia beads (2 mm) until pigment particles are milled to 5 μm or smaller on a ground gauge. Further, dispersion is carried out in a nanomill filled with zirconia beads (0.3 mm) until pigment particles are milled to 250 nm in average particle size, thereby obtaining a pigment dispersion. While stirring the pigment dispersion at 1,500 rpm, the fixing polymer solution and the particular solvent or a mixed solvent of the particular solvent and cyclic ester are added as much as needed such that, after being kneaded and dispersed into a uniform mixture, its viscosity is adjusted preferably to 2 to 18 mPa·s, more preferably to 7 to 14 mPa·s at 25° C. to obtain the ink of the present invention. It is to be noted that the viscosity of the ink is a value as measured by a viscometer "AMVn" (trade name; manufactured by Anton Parr GmbH). On the other hand, the particle size of the pigment is a value as measured by "MICROTRAC UPA 150" (trade name; manufactured by Nikkiso Co., Ltd.".

If the viscosity of the ink is too high, ink clogging tends to occur in printhead nozzles, thereby requiring heating of the printhead to lower the viscosity. As a result of this heating, the solvent in the ink is facilitated to evaporate so that the ink clogging is aggravated. If the viscosity of the ink is too low, on the other hand, printability is reduced. Printing of known media, for example, plastic films such as polyvinyl chloride films with the above-described ink can be performed using a conventional piezoelectric inkjet printer.

EXAMPLES

Based on the following production examples of fixing polymers (J1-J11), examples of inks (K1-K12) making use of those fixing polymers (J1-J10) and comparative examples of inks (L1-L5) making use of the fixing polymer (J11) and conventional fixing polymers, respectively, the present invention will next be described more specifically. In the following production examples, examples and comparative examples, the designations of "part" or "parts and "%" are on a weight basis unless otherwise specifically indicated. It is to be noted that the present invention shall not be limited to the following production examples, examples and comparative examples.

Production of Fixing Polymer J1

Into ethylene glycol monobutyl ether acetate (300 g) maintained at 100° C., a mixture of methyl methacrylate (200 g) and t-butylperoxy-2-ethylhexanoate (1.8 g) was added dropwise over 1.5 hours. Subsequent to the dropwise addition, they were reacted at 100° C. for 2 hours. The reaction mixture was then cooled to afford a colorless clear solution of a fixing polymer J1 (weight average molecular weight: 25,000, glass transition point: 105° C.).

The weight average molecular weight and glass transition point are values measured by the following methods, respectively.

(Weight Average Molecular Weight and Glass Transition Point)

From the thus-obtained, fixing polymer solution, a sample of the polymer alone was prepared in a form purified with hexane. Using "HLC-8220GPC" (trade name; manufactured by Tosoh Corporation), the sample was measured for its molecular weight by gel permeation chromatography (GPC) using polystyrenes as standards. On the other hand, the glass transition point was determined by measuring the sample with a differential scanning calorimeter "DSC-50" (trade name; manufactured by Shimadzu Corporation).

Using a MALDITOF-MS (matrix-assisted laser desorption ionization-time of flight mass spectroscopy) ("AXIMA-CFR-PLUS", trade mark; manufactured by Shimadzu Corporation; matrix: dithranol; cationizing agent: NaI), thermal decomposition products of the fixing polymer were analyzed to determine their mass numbers, and the results shown in FIG. 1 were obtained. The mass spectrum shown in FIG. 1 includes detection peaks at m/e 823, 883, 923, 983, 1023 and 1083. These values indicate the molecular masses of compounds formed by $Na^+$ ionization of the thermal decomposition products of the fixing polymer.

Figure 1:
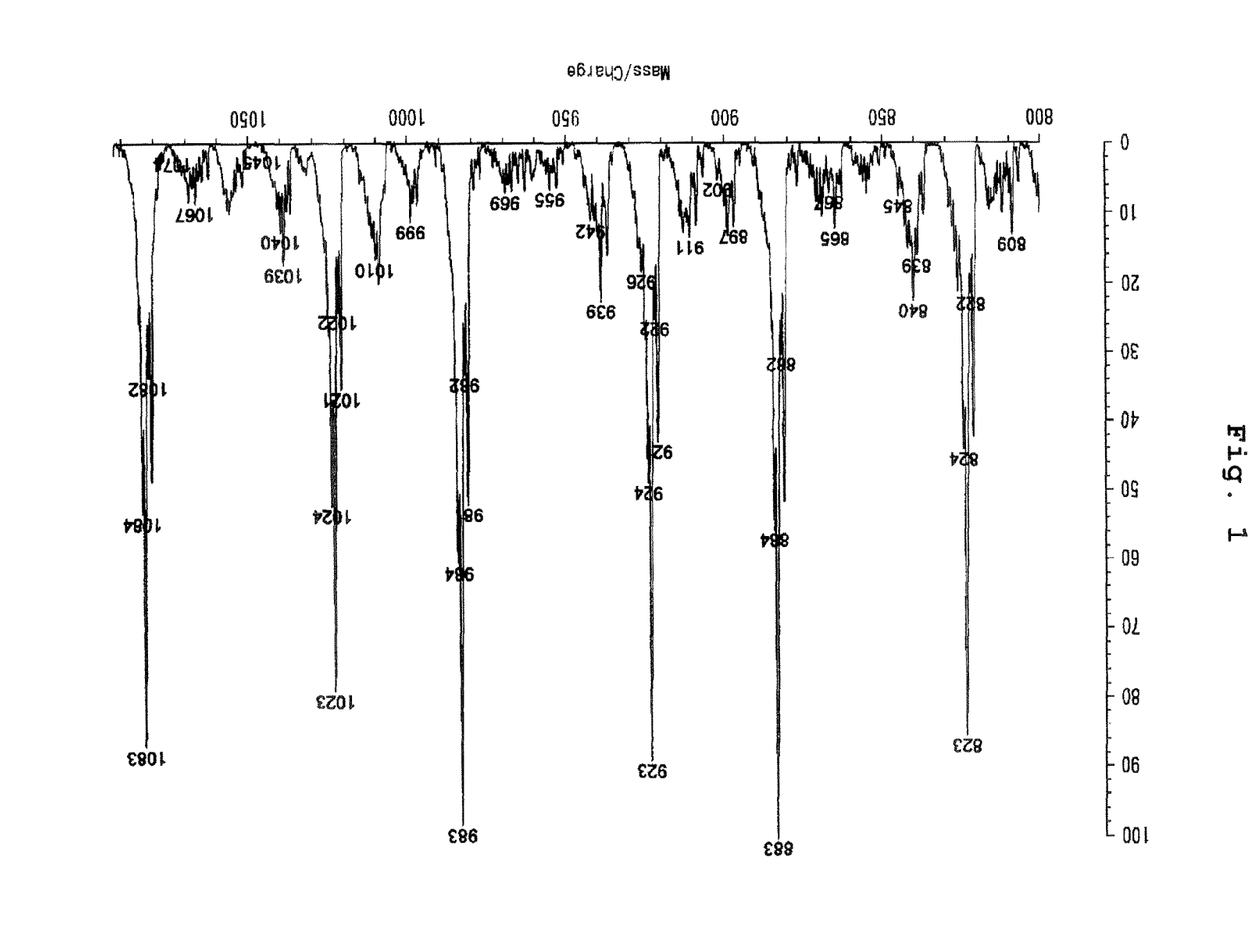
FIG. 1 is a chart of a mass spectrum obtained as a result of a measurement of mass numbers on a fixing polymer J1 of the present invention by a MALDITOF-MS (matrix-assisted laser desorption ionization-time of flight mass spectroscopy) ("AXIMA-CFRPLUS", trade mark; manufactured by Shimadzu Corporation; matrix: dithranol; cationizing agent: NaI).

Among the detection peaks in the above analysis, the mass numbers "883, 983, 1083" are in conformity with the mass numbers of the compounds formed by the $Na^+$ ionization of the thermal decomposition products of the fixing polymer, said thermal decomposition products having, at one ends of their molecules, structures derived from ethylene glycol monobutyl ether acetate employed as a solvent in the polymerization, respectively. On the other hand, the mass numbers "823, 923, 1023" are in conformity with the mass numbers of the compounds formed by the $Na^+$ ionization of the thermal decomposition products of the fixing polymer, said thermal decomposition products having, at the other ends of their molecules, structures derived from t-butyl peroxy-2-ethylhexanoate employed as a radical polymerization initiator in the polymerization, respectively.

The detection results of mass numbers by the above analysis indicate that the fixing polymer according to the present invention is a mixture of a fixing polymer containing, at one end of its molecule, the structure derived from the particular solvent according to the present invention (ethylene glycol monobutyl ether acetate) and another fixing polymer containing, at one end of its molecule, the structure derived from the radical polymerization initiator.

Production of Fixing Polymer J2

In a similar manner as in the production of the fixing polymer J1 except that the usage amount of t-butyl peroxy-2-ethylhexanoate was changed to 0.6 g, a colorless clear solution of a fixing resin J2 (weight average molecular weight: 50,000, glass transition point: 105° C.) was afforded.

Production of Fixing Polymer J3

In a similar manner as in the production of the fixing polymer J1 except that the usage amount of methyl methacrylate was changed to 180 g and the usage amount of t-butyl peroxy-2-ethylhexanoate was changed to 0.3 g, a colorless clear solution of a fixing resin J3 (weight average molecular weight: 90,000, glass transition point: 105° C.) was afforded.

Production of Fixing Polymer J4

In a similar manner as in the production of the fixing polymer J1 except that the usage amount of methyl methacrylate was changed to 180 g and a mixture of n-butyl methacrylate (20 g) and 5-butyl peroxy-2-ethylhexanoate (4 g) was added, a colorless clear solution of a fixing resin J4 (weight average molecular weight: 30,000, glass transition point: 94° C.) was afforded.

Production of Fixing Polymer J5

In a similar manner as in the production of the fixing polymer J4 except that n-butyl methacrylate was replaced by 2-ethoxyethyl methacrylate, a colorless clear solution of a fixing resin J5 (weight average molecular weight: 30,000, glass transition point: 85° C.) was afforded.

Production of Fixing Polymer J6

In a similar manner as in the production of the fixing polymer J4 except that n-butyl methacrylate was replaced by benzyl methacrylate, a colorless clear solution of a fixing resin J6 (weight average molecular weight: 30,000, glass transition point: 91° C.) was afforded.

Production of Fixing Polymer J7

In a similar manner as in the production of the fixing polymer J1 except that the usage amount of t-butyl peroxy-2-ethylhexanoate was changed to 8.0 g, a colorless clear solution of a fixing resin J7 (weight average molecular weight: 12,000, glass transition point: 105° C.) was afforded.

Production of Fixing Polymer J8

Into propylene glycol monomethyl ether acetate (300 g) maintained at 100° C., a mixture of methyl methacrylate (200 g) and t-butylperoxy-2-ethylhexanoate (4.8 g) was added dropwise over 1.5 hours. Subsequent to the dropwise addition, they were reacted at 100° C. for 2 hours. The reaction mixture was then cooled to afford a colorless clear solution of a fixing polymer J8 (weight average molecular weight: 20,000, glass transition point: 105° C.).

Production of Fixing Polymer J9

Into propylene glycol monomethyl ether acetate (300 g) maintained at 120° C., a mixture of methyl methacrylate (200 g) and t-butyl peroxyisopropylmonocarbonate (4.8 g) was added dropwise over 1.5 hours. Subsequent to the dropwise addition, they were reacted at 120° C. for 2 hours. The reaction mixture was then cooled to afford a colorless clear solution of a fixing polymer J9 (weight average molecular weight: 21,000, glass transition point: 105° C.).

Production of Fixing Polymer J10

Into propylene glycol monomethyl ether acetate (300 g) maintained at 100° C., a mixture of methyl methacrylate (200 g) and dibenzoyl peroxide (6.0 g) was added dropwise over 1.5 hours. Subsequent to the dropwise addition, they were reacted at 100° C. for 2 hours. The reaction mixture was then cooled to afford a colorless clear solution of a fixing polymer J10 (weight average molecular weight: 16,000, glass transition point: 105° C.).

Production of Fixing Polymer J11

In a similar manner as in the production of the fixing polymer J1 except that ethylene glycol monobutyl ether acetate was replaced by toluene and the usage amount of t-butyl peroxy-2-ethylhexanoate was changed to 1.0 g, a colorless clear solution of a fixing resin J11 (weight average molecular weight: 30,000, glass transition point: 105° C.) was afforded.

With respect to the fixing polymers J2-J7, analyses were performed in a similar manner as in the case of the fixing resin J1. From the mass numbers obtained in those analyses, it has been found that like the fixing polymer J1, the fixing polymers J2-J7 each contained structures derived from the corresponding particular solvent and bonded to one ends of its molecules, respectively.

Figure 2:
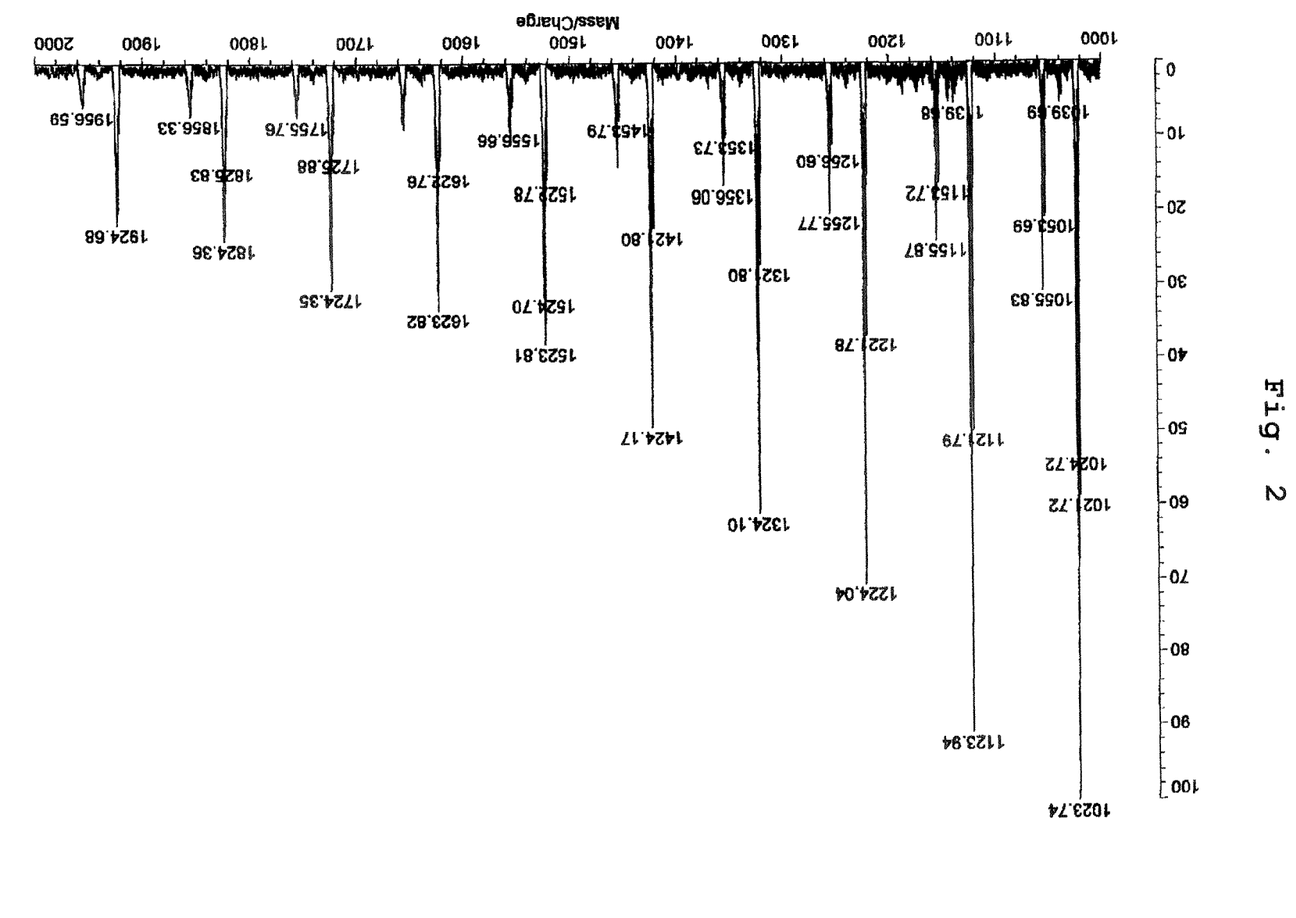
FIG. 2 is a chart of a mass spectrum obtained as a result of a measurement of mass numbers on a fixing polymer J8 of the present invention by the MALDITOF-MS (matrix-assisted laser desorption ionization-time of flight mass spectroscopy) ("AXIMA-CFRPLUS", trade mark; manufactured by Shimadzu Corporation; matrix: dithranol; cationizing agent: NaI).

Concerning the fixing polymers J8-J10, analyses were performed in a similar manner as in the case of the fixing polymer 1 to determine their mass numbers. The results shown in FIG. 2, FIG. 3 and FIG. 4 were obtained, respectively. Some of the detection peaks on the fixing polymer J8 as shown in FIG. 2, that is, the mass numbers "1055, 1155, 1255" are in conformity with the mass numbers of compounds formed by $Na^+$ ionization of thermal decomposition products of the fixing polymer, said thermal decomposition products having, at one ends of their molecules, structures derived from propylene glycol monomethyl ether acetate employed as a solvent in the polymerization, respectively. Further, some others of the detection peaks, that is, the mass numbers "1023, 1123" are in conformity with the mass numbers of compounds formed by the $Na^+$ ionization of thermal decomposition products of the fixing polymer, said thermal decomposition products having, at the other ends of their molecules, structures derived from t-butyl peroxy-2-ethylhexanoate employed as a radical polymerization initiator in the polymerization, respectively.

Figure 3:
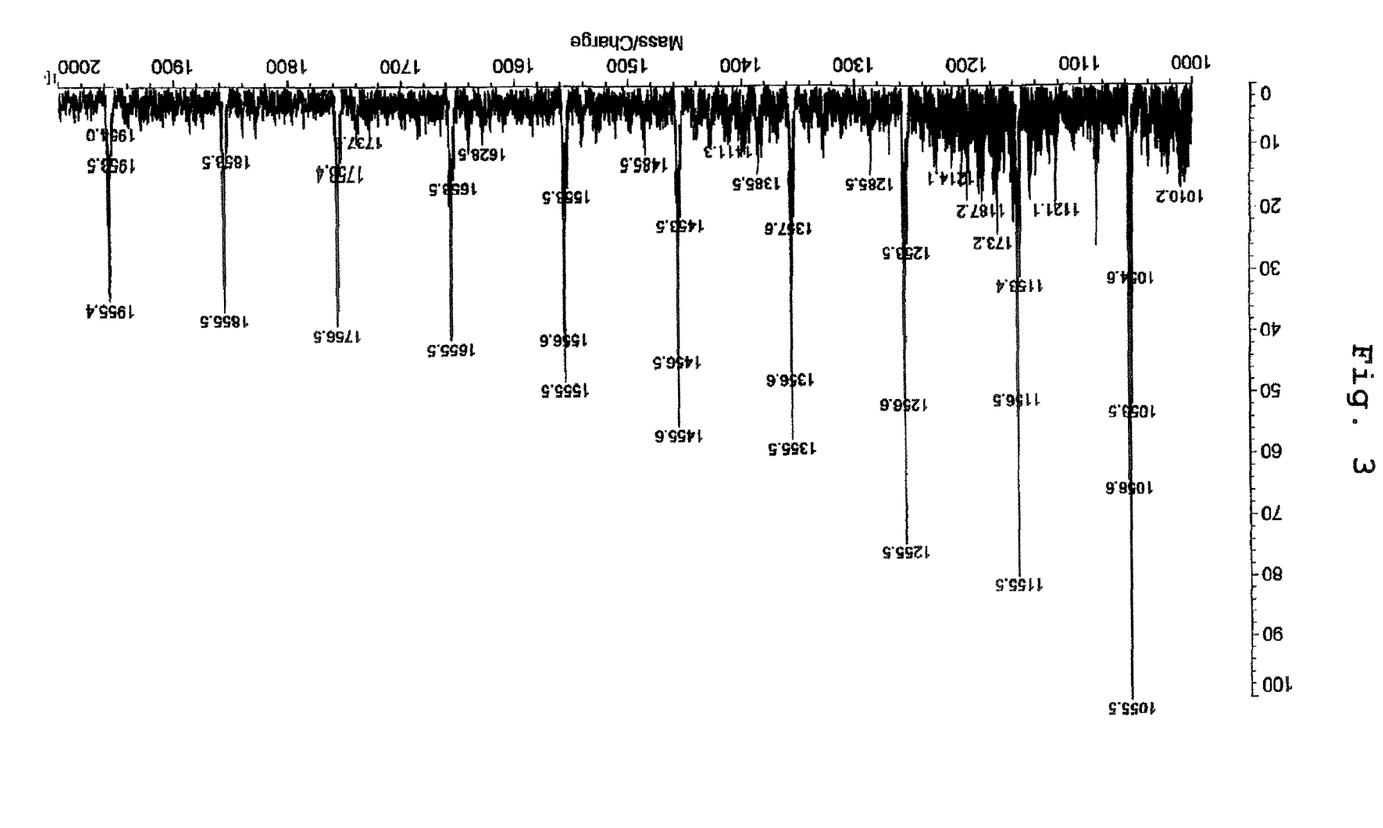
FIG. 3 is a chart of a mass spectrum obtained as a result of a measurement of mass numbers on a fixing polymer J9 of the present invention by the MALDITOF-MS (matrix-assisted laser desorption ionization-time of flight mass spectroscopy) ("AXIMA-CFRPLUS", trade mark; manufactured by Shimadzu Corporation; matrix: dithranol; cationizing agent: NaI).

Some of the detection peaks on the fixing polymer J9 as shown in FIG. 3, that is, the mass numbers "1355, 1455, 1555, 1655" are in conformity with the mass numbers of compounds formed by $Na^+$ ionization of thermal decomposition products of the fixing polymer, said thermal decomposition products having, at one ends of their molecules, structures derived from propylene glycol monomethyl ether acetate employed as a solvent in the polymerization, respectively. Further, some others of the detection peaks, that is, the mass numbers "1357, 1457, 1557" are in conformity with the mass numbers of compounds formed by $Na^+$ ionization of thermal decomposition products of the fixing polymer, said thermal decomposition products having, at the other ends of their molecules, structures derived from t-butyl peroxyisopropylmonocarbonate employed as a radical polymerization initiator in the polymerization, respectively.

Figure 4:
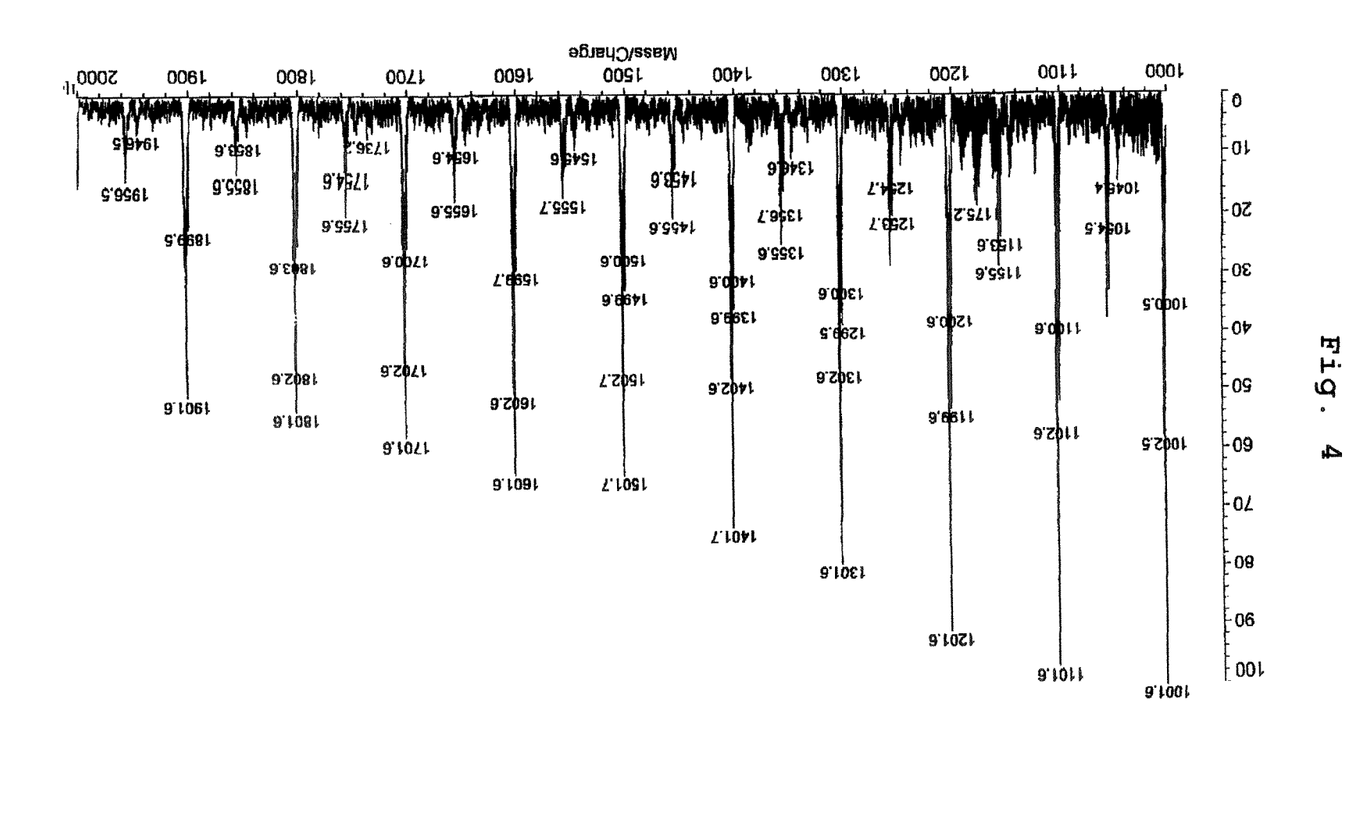
FIG. 4 is a chart of a mass spectrum obtained as a result of a measurement of mass numbers on a fixing polymer J10 of the present invention by the MALDITOF-MS (matrix-assisted laser desorption ionization-time of flight mass spectroscopy) ("AXIMA-CFRPLUS", trade mark; manufactured by Shimadzu Corporation; matrix: dithranol; cationizing agent: NaI).

Some of the detection peaks on the fixing polymer J10 as shown in FIG. 4, that is, the mass numbers "1355, 1455, 1555, 1655" are in conformity with the mass numbers of compounds formed by $Na^+$ ionization of thermal decomposition products of the fixing polymer, said thermal decomposition products having, atone ends of their molecules, structures derived from propylene glycol monomethyl ether acetate employed as a solvent in the polymerization, respectively. Further, some others of the detection peaks, that is, the mass numbers "1301, 1401, 1501, 1601" are in conformity with the mass numbers of compounds formed by $Na^+$ ionization of thermal decomposition products of the fixing polymer, said thermal decomposition products having, at the other ends of their molecules, structures derived from dibenzoyl peroxide employed as a radical polymerization initiator in the polymerization, respectively.

From the above-described analysis results of the fixing polymers J1-J10, it has been verified that those fixing polymers each contained a reaction product having a structure, which had been derived from the corresponding particular solvent, at one end of each molecule of an acrylic polymer.

Examples 1-12

Inks K1-K12 of the present invention were each formulated by combining the corresponding one of the solutions of the fixing polymer J1-J10 obtained as described above, a vinyl chloride/vinyl acetate copolymer (only for the ink K8 of the present invention), the colorant (Pigment Red 122), the dispersant and the corresponding solvents as shown in Table 1 or Table 2, and mixing them into a uniform mixture such that the viscosity became 7 mPa·s to 14 mPa·s as measured by a viscometer "AMVn" (trade name; manufactured by Anton Parr GmbH). It is to be noted that as appreciated from the above-described formulation of the inks, the formulation of each ink was carried out by firstly combining portions of its corresponding solvents, the colorant and the dispersant to prepare a pigment dispersion and then adding the solution of the corresponding one of the fixing polymers and the remaining portion of the corresponding solvents while stirring the pigment dispersion as a uniform dispersion at 1,500 rpm

TABLE 1

| | | Example | | | | | |
|---|---|---|---|---|---|---|---|
| | | 1 | 2 | 3 | 4 | 5 | 6 |
| | Ink | K1 | K2 | K3 | K4 | K5 | K6 |
| Fixing polymer | J1 | 8.0 | — | — | — | — | — |
| | J2 | — | 8.0 | — | — | — | — |
| | J3 | — | — | 8.0 | — | — | — |
| | J4 | — | — | — | 8.0 | — | — |
| | J5 | — | — | — | — | 8.0 | — |
| | J6 | — | — | — | — | — | 8.0 |
| | J7 | — | — | — | — | — | — |
| | Vinyl chloride/vinyl acetate copolymer** | — | — | — | — | — | — |
| Solvent | Ethylene glycol monobutyl ether acetate | 66.0 | 66.0 | 66.0 | 66.0 | 66.0 | 66.0 |
| | γ-Butyrolactone | 20.0 | 20.0 | 20.0 | 20.0 | 20.0 | 20.0 |
| | γ-Valerolactone | — | — | — | — | — | — |
| | Pigment | 4.0 | 4.0 | 4.0 | 4.0 | 4.0 | 4.0 |
| | "SOLPERSE 32000" | 2.0 | 2.0 | 2.0 | 2.0 | 2.0 | 2.0 |
| | Viscosity (mPa · s) (25° C.) | 8.9 | 10.4 | 13.2 | 9.1 | 9.3 | 9.2 |

TABLE 2

|  | Ink | Example 7 K7 | 8 K8 | 9 K9 | 10 K10 | 11 K11 | 12 K12 |
|---|---|---|---|---|---|---|---|
| Fixing polymer | J1 | 8.0 | 5.0 | — | — | — | — |
|  | J2 | — | — | — | — | — | — |
|  | J3 | — | — | — | — | — | — |
|  | J4 | — | — | — | — | — | — |
|  | J5 | — | — | — | — | — | — |
|  | J6 | — | — | — | — | — | — |
|  | J7 | — | — | 8.0 | — | — | — |
|  | J8 | — | — | — | 8.0 | — | — |
|  | J9 | — | — | — | — | 8.0 | — |
|  | J10 | — | — | — | — | — | 8.0 |
|  | Vinyl chloride/vinyl acetate copolymer** | — | 1.5 | — | — | — | — |
| Solvent | Ethylene glycol monobutyl ether acetate | 66.0 | 67.5 | 66.0 | 56.0 | 56.0 | 56.0 |
|  | Propylene glycol monomethyl ether acetate | — | — | — | 10.0 | 10.0 | 10.0 |
|  | γ-Butyrolactone | — | 20.0 | 20.0 | 20.0 | 20.0 | 20.0 |
|  | γ-Valerolactone | 20.0 | — | — | — | — | — |
|  | Pigment | 4.0 | 4.0 | 4.0 | 4.0 | 4.0 | 4.0 |
|  | "SOLPERSE 32000" | 2.0 | 2.0 | 2.0 | 2.0 | 2.0 | 2.0 |
|  | Viscosity (mPa·s) (25° C.) | 9.4 | 10.3 | 7.8 | 8.3 | 8.5 | 8.0 |

In Table 1 and 2, the double asterisk (**) indicates use of "UCAR SOLUTION VINYL RESIN VYHH" (trade name; product of The Dow Chemical Company). The values in the tables represent proportions in terms of parts. Further, the proportions of the fixing polymers in Table 1 and Table 2 are their solid proportions.

Comparative Example 1

An ink L1 having a viscosity of 9.0 mPa·s (25° C.) was formulated in a similar manner as in Example 1 except that the solution of the fixing polymer J1 was replaced by the solution of the fixing polymer J11.

Comparative Example 2

An ink L2 having a viscosity of 11.4 mPa·s (25° C.) was formulated in a similar manner as in Example 1 except that the solution of the fixing polymer J1 was replaced by a solution prepared by dissolving a polymer ("DIANAL BR83", trade name; product of Mitsubishi Rayon Co., Ltd.) at the same concentration in the same solvent as the solution of the fixing polymer J1.

Comparative Example 3

An ink L3 having a viscosity of 9.2 mPa·s (25° C.) was formulated in a similar manner as in Example 1 except that the solution of the fixing polymer J1 was replaced by a solution prepared by dissolving a polymer ("PARALOID B60", trade name; product of Rohm & Haas Company) at the same concentration in the same solvent as the solution of the fixing polymer J1.

Comparative Example 4

An ink L4 having a viscosity of 8.1 mPa·s (25° C.) was formulated in a similar manner as in Example 1 except that the solution of the fixing polymer J1 was replaced by a solution prepared by dissolving a polymer ("PARALOID B99N", trade name; product of Rohm & Haas Company) at the same concentration in the same solvent as the solution of the fixing polymer J1.

Comparative Example 5

An ink L5 having a viscosity of 10.5 mPa·s (25° C.) was formulated in a similar manner as in Example 8 except that the solution of the fixing polymer J1 was replaced by a solution prepared by dissolving a polymer ("PARALOID B60", trade name; product of Rohm & Haas Company) at the same concentration in the same solvent as the solution of the fixing polymer J1.

The inks obtained as described above were measured and evaluated for drying properties, abrasion resistance, storage stability and ejectability (ejection stability and ejection recoverability) by the below-described methods. The evaluation results are shown in Table 3 and Table 4.

(Drying Properties)

On an ink spreading table heated at 40° C., the above-described inks were each separately spread onto two sheets of "TERPOLIN KB-1000GS" (trade name; product of K.K. Lukio) by a #8 bar coater. The ink spread areas were brought into a contiguous relation one over the other. This procedure was repeated to determine the drying time required until such ink spread areas no longer stuck on each other.

Evaluation Grades:
  A: Ink spread areas no longer stick on each other in a drying time of shorter than 5 minutes.
  B: Needs a drying time of 5 minutes or longer until ink spread areas no longer stick on each other.

(Abrasion Resistance)

On an ink spreading table heated at 40° C., the above-described inks were each separately spread onto a sheet of "TERPOLIN KB-100GS" (trade name; product of K.K. Lukio) by a #8 bar coater. The sheet with the ink spread thereon was left over for 1 hour under an atmosphere of 60° C., and after that, the ink spread surface of the sheet was rubbed with a swab soaked in a 70:30 (weight ratio) solution of ethyl alcohol and water. Conditions of the ink spread surface were evaluated by the following method.

Evaluation Grades:
  A: No rub-off is observed at all on an ink spread surface.
  B: Rub-off is observed on the entire part or a part of an ink spread surface.

(Storage Stability)

The above-described inks were each separately placed in a glass bottle, left over at room temperature for 3 days, and then evaluated by the following method.

Evaluation Grades:
- A: A phenomenon such as precipitation or liquid separation is not observed at all in an ink.
- B: An ink has separated into two layers.

(Ejectability)

Separately using each of the inks obtained as described above, "TERPOLIN KB-1000GS" (trade name; product of K.K. Lukio) as a recording medium was printed for several seconds by an ejection evaluating tester on which a piezoelectric SPECTRA NOVA™ 256-nozzle printhead (manufactured by Spectra-Nova Technologies, Inc.) was mounted. Subsequently, the printing was stopped, the printhead was left over, and then, printing was resumed. Ejectability was evaluated relying upon the left-over time of the printhead until five or more nozzles showed a defective ink ejection that the ink did not fly straight but was ejected along a curve from the nozzles shortly after the resumption of the printing or the nozzles failed to eject.

Evaluation Grades:
- A: The left-over time of the printhead until five or more nozzles show a defective ink ejection is 5 minutes or longer.
- B: The left-over time of the printhead until five or more nozzles show a defective ink ejection is shorter than 5 minutes.

TABLE 3

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| | Ink | K1 | K2 | K3 | K4 | K5 | K6 | K7 | K8 | K9 | K10 | K11 | K12 |
| Properties | Drying properties | A | A | A | A | A | A | A | A | A | A | A | A |
| | Abrasion resistance | A | A | A | A | A | A | A | A | A | A | A | A |
| | Storage stability | A | A | A | A | A | A | A | A | A | A | A | A |
| | Ejectability | A | A | A | A | A | A | A | A | A | A | A | A |

TABLE 4

| | | Comparative Example | | | | |
|---|---|---|---|---|---|---|
| | | 1 | 2 | 3 | 4 | 5 |
| | Ink | L1 | L2 | L3 | L4 | L5 |
| Properties | Drying properties | A | A | B | B | B |
| | Abrasion resistance | A | A | B | B | A |
| | Storage stability | B | B | A | A | A |
| | Ejectability | A | A | A | A | A |

From the evaluation results described above, the inks of the present invention were confirmed to be excellent in drying properties, abrasion resistance, storage stability and ejectability because compared with conventional inks, their fixing polymers had extremely good solubility to solvents despite their high molecular weights and high glass transition points. On the other hand, Comparative Examples 1 and 2 were inferior in storage stability, Comparative Examples 3 and 4 were inferior in drying properties and abrasion resistance, and Comparative Example 5 was inferior in drying properties.

Especially from the evaluation results of ejectability, the inks of the present invention were practically resistant to the development of a defective ink ejection from nozzles even when printing was performed repeatedly, and were extremely good in ejection recoverability even when the printhead was left over.

This application claims the priority of Japanese Patent Application 2006-135967 filed May 16, 2006, which is incorporated herein by reference.

The invention claimed is:

1. An oil-based ink composition for inkjet printers, comprising a fixing polymer and a solvent, said fixing polymer being an acrylic polymer obtained by subjecting an acrylic monomer to solution polymerization with a radical polymerization initiator in said solvent,
wherein said solvent is at least one solvent selected from the group consisting of ethylene glycol monobutyl ether acetate and diethylene glycol monobutyl ether acetate;
said radical polymerization initiator is at least one organic peroxide selected from the group consisting of organic peroxides of the peroxyester, dialkyl peroxide, diacyl peroxide and peroxyketal type;
the ratio (v/u) of said radical polymerization initiator (v) to said acrylic monomer (u) is from 0.1/100 to 20/100 by weight;
said fixing polymer comprises a reaction product of an acrylic polymer with molecules of said solvent bonded to one end of said acrylic polymer; and wherein
said fixing polymer is selected from the group consisting of a homopolymer of methyl methacrylate and a copolymer between methyl methacrylate (x) and at least one monomer (y) selected from the group consisting of butyl methacrylate, ethoxyethyl methacrylate and benzyl methacrylate, and a copolymerization ratio (y/x) of said copolymer being from 0.01/100 to 60/100 by weight.

2. The ink composition according to claim 1, wherein said radical polymerization initiator is at least one organic peroxide selected from group consisting of t-butyl peroxy-2-ethylhexanoate, dibenzoyl peroxide, and t-butyl peroxyisopropylmonocarbonate.

3. The ink composition according to claim 1, wherein a ratio (p/b) of said acrylic monomer (p) to said solvent (b) is from 10/100 to 150/100 by weight.

4. The ink composition according to claim 1, wherein said fixing polymer has a glass transition point of at least 80° C.

5. The ink composition according to claim 1, wherein said fixing polymer has a weight average molecular weight of from 10,000 to 100,000.

6. The ink composition according to claim 1, further comprising at least one resin selected from vinyl chloride resins and cellulose-based resins.

7. The ink composition according to claim 1, further comprising a cyclic ester.

8. The ink composition according to claim 7, wherein said cyclic ester is a compound represented by the following formula (2):

(2)

wherein X3 and X4 each independently represents a hydrogen atom or a $C_{1-7}$ alkyl or alkenyl group, and m stands for an integer of from 1 to 3.

9. The ink composition according to claim 1, further comprising a dispersant.

10. The ink composition according to claim 1, further comprising a colorant.

11. A process for the production of an oil-based ink composition for inkjet printers according to claim 1, which comprises subjecting an acrylic monomer to solution polymerization with a radical polymerization initiator in said solvent.

12. The ink composition according to claim 1, wherein said solvent is ethylene glycol monobutyl ether acetate.

13. The ink composition according to claim 1, wherein said solvent is diethylene glycol monobutyl ether acetate.

14. The ink composition according to claim 1, wherein said fixing polymer is a homopolymer of methyl methacrylate or a copolymer between methyl methacrylate (x) and at least one monomer (y) selected from group consisting of ethoxyethyl methacrylate and benzyl methacrylate.

15. The ink composition according to claim 1, wherein said fixing polymer is a homopolymer of methyl methacrylate.

16. The ink composition according to claim 1, wherein said fixing polymer is a copolymer between methyl methacrylate (x) and ethoxyethyl methacrylate (y).

17. The ink composition according to claim 1, wherein said fixing polymer is a copolymer between methyl methacrylate (x) and benzyl methacrylate (y).

18. The ink composition according to claim 1, wherein said fixing polymer is a copolymer between methyl methacrylate (x) and butyl methacrylate (y).

* * * * *